United States Patent [19]

Hughes

[11] Patent Number: 5,114,893
[45] Date of Patent: May 19, 1992

[54] METHOD OF IMPROVING WATER-SWELLABLE CLAY PROPERTIES BY RE-DRYING, COMPOSITIONS AND ARTICLES

[75] Inventor: John Hughes, Long Grove, Ill.

[73] Assignee: American Colloid Company, Arlington Heights, Ill.

[21] Appl. No.: 608,816

[22] Filed: Nov. 5, 1990

[51] Int. Cl.$^5$ ............................................. C04B 33/02
[52] U.S. Cl. .................................. 501/149; 501/150; 106/DIG. 4
[58] Field of Search .............................. 501/149, 150; 252/8.512, 8.514; 106/DIG. 4

[56] References Cited

U.S. PATENT DOCUMENTS

| | | | |
|---|---|---|---|
| 3,186,896 | 6/1965 | Clem | 428/182 |
| 4,021,407 | 5/1977 | Gough et al. | 252/406 |
| 4,084,382 | 4/1978 | Clem | 405/264 |
| 4,087,365 | 5/1978 | Clem | 252/8.511 |
| 4,279,547 | 7/1981 | Clem | 405/258 |
| 4,534,925 | 8/1985 | Harriet | 405/128 |
| 4,534,926 | 8/1985 | Harriet | 405/128 |
| 4,634,538 | 1/1982 | Alexander | 405/264 |
| 4,696,698 | 9/1987 | Harriet | 405/267 |
| 4,696,699 | 9/1987 | Harriet | 405/267 |
| 4,733,989 | 3/1988 | Harriet | 405/43 |
| 4,810,573 | 3/1989 | Harriet | 405/43 |
| 4,886,550 | 12/1989 | Alexander | 405/267 |

FOREIGN PATENT DOCUMENTS 346280 3/1977 U.S.S.R. ............................... 501/150

Primary Examiner—Mark L. Bell
Assistant Examiner—Deborah Jones
Attorney, Agent, or Firm—Marshall, O'Toole, Gerstein, Murray & Bicknell

[57] ABSTRACT

A method of treating a water-swellable clay after the clay has been mined and dried. After the common initial drying of the clay to a moisture content of 12% or less, the clay is re-wetted to a moisture content of more than 12% by weight, preferably at least about 15% or more, based on the dry weight of the clay, then redried to a moisture content of 12% by weight or less, based on the dry weight of the clay. This re-wetting and re-drying processing of a dried clay unexpectedly improves the water absorbency, and viscosity properties; increases the effectiveness of the clays as binders in sand molds and iron ore pelletizing; unexpectedly increases the rheology properties of the clays for oilwell drilling fluids, and lost circulation fluids, and as a suspending agent in the cosmetics and pharmaceutical industries; improves the binding characteristics of the clays to act as a binder for iron ores, such as taconite, and sand molding (foundry industry); and provides unexpectedly increased water absorption in forming water-swellable clay-based water barriers.

11 Claims, No Drawings

METHOD OF IMPROVING WATER-SWELLABLE CLAY PROPERTIES BY RE-DRYING, COMPOSITIONS AND ARTICLES

FIELD OF THE INVENTION

The present invention is directed to a method of improving many of the properties of a water-swellable clay, such as bentonite, including the steps of drying the mined clay, re-wetting the clay, and re-drying the clay to improve its water-absorbtion ability; the dispersion of the clay in water; viscosity; fluid loss properties; ability to bind finely pulverised ores; and to improve its foundry properties as a binder for sand in the metal casting industry. The processed, re-wetted and re-dried water-swellable clay is unexpectedly better for use in oil well drilling fluids; lost circulation fluids; as a flocculant, for example in waste water treatment and wine clarification as a suspending agent in the cosmetics and pharmaceutical industries; as a water-absorbable material to form a water barrier in panels, and flexible, multi-layer articles; for use in water-absorbant articles, such as diapers, tampons and the like; for pelletizing iron ore, particularly taconite; and for any other purpose that uses a water-swellable clay for its water absorption properties, dispersion properties, viscosity properties, and/or its ability to act as a binder.

BACKGROUND OF THE INVENTION AND PRIOR ART

Water-swellable clays have a great number of industrial uses that rely upon the ability of the clay to absorb many times its weight in water, to provide a gel structure of sufficient strength to hold solids in suspension, and the ability of the water-swellable clays to act as a binder in forming sand molds in the metal casting industry and in pelletizing finely divided ores, e.g. iron ores, such as taconite. Some of these industrial uses are generally described below.

1. Drilling Muds

In drilling wells by rotary methods it is a common practice to circulate, continuously, a drilling mud or fluid into and out of the borehole during the drilling operation. The drilling mud is pumped into the drill pipe from a mud pit and the mud passes down to the bottom of the borehole. The drilling mud then flows upwardly through the annular space between the borehole wall and the drill pipe, and finally flows from the borehole through a mud ditch back to the mud pit, wherein the mud is mechanically or chemically treated before recirculation through the borehole.

The drilling mud serves several purposes that influence such factors as the drilling rate, cost, efficiency and safety of the operation. The drilling mud lubricates and cools the drill bit, acts as a vehicle to carry the cuttings from the borehole, and provides sufficient equalizing hydrostatic pressure against the formation wall to prevent the borehole wall for cave-in during drilling. By using proper mud formulations, the borehole entry of gases and fluids encountered in the formations pierced by the drill is inhabited and possible collapse or blowouts resulting from uncontrolled influxes of these formation fluids may be prevented. The drilling mud also exerts a "wall-building" effect whereby it often forms a thin filter cake on a borehole wall, thus sealing off the forehole and reducing water loss to the penetrated formations.

An acceptable mud must have body yet be free-flowing with relatively low viscosity in order to facilitate pumping. The mud must also have an acceptable gel strength in order to suspend solid material if circulation is interrupted and to prevent accumulation of solids at the drill bit to avoid mechanical jamming. Acceptable drilling muds may be either oil-based or water-based, and they are normally treated to provide the rheological properties that make them particularly desirable and useful for drilling wells. For example, drilling muds may be treated with barium sulfate (barite) or lead sulfide (galena) to increase their density.

The efficiency of the drilling process is related to the velocity of the mud flowing up the annular space between the borehole wall and the drill pipe. This velocity is in turn related to the viscosity, density and flow properties of the mud. In addition, the drilling mud viscosity is known to depend upon the quality, concentration and state of dispersion of the colloidal solids of the mud. As the drilling operation proceeds, the rheological properties of the mud may be adversely affected by such factors as the nature of the drilled strata, loss or gain of water to the mud, chemically-active contaminants that may flocculate the mud, mud pH, and most importantly, the increasing temperatures and pressures encountered at deeper drilling depths. In order to maintain workable viscosities, the muds must be formulated to respond to varying circumstances and conditions encountered during use. Since improvements in efficiency are realized as the viscosity and density of a mud are increased, it is desirable to optimize drilling mud formulations to possess the highest viscosity and density workably feasible for a given formation at a given depth.

Whenever possible, usually for reasons of economy, water-based drilling muds are used throughout the drilling operation. The suspending solids in water-based drilling muds are typically clays from the kaolinite, montmorillomite or ilite groups. These clays impart desirable thixotropic properties to the drilling mud and also coat the walls of the well with a relatively impermeable sheath, commonly called a "filter cake", that retards Fluid loss from the well into the formations penetrated by the well.

An exemplary montmorillomite clay that can be used in a water-based drilling mud is bentonite. The bentonite is dispersed within the water-based liquid as colloidal particles and imparts various degrees of thixotropy to the drilling mud. Water-swellable clays that are re-wetted and re-dried, in accordance with the present invention, have excellent rheological properties for use in preparing an aqueous drilling muds.

2. Lost Circulation Fluid

One difficulty often encountered in rotary drilling operations involves the loss of unacceptably large amounts of the drilling mud into a porous or cracked formation penetrated by the drill. The loss of drilling mud is termed "lost circulation", and the formation is termed a "lost circulation zone" or a "thief formation".

Lost circulation occurs when the well encounters a formation either having unusually high permeability or having naturally occurring fractures, fissures, porous sand formations, cracked or cavernous formations and other types of strata characterized by crevices, channels or similar types of openings conducive to drilling fluid loss. In addition, it is also possible for a formation to be fractured by the hydrostatic pressure of the drilling mud, particularly when a changeover is made to a relatively heavy mud in order to control high internal formation pressures.

When lost circulation occurs, the drilling mud pumped into the well through the drill string enters the cracks in a cracked formation or the interstices of a porous formation and escapes from the wellbore, therefore precluding return of the drilling mud to the surface. In the most severe situation, the lost circulation zone takes the drilling mud as fast as it is pumped into the wellbore, and, in less severe situations, circulation of the drilling mud can be greatly reduced, and eventually result in a shutdown of drilling operations. Normally, the maximum amount of drilling mud loss that is tolerated before changing programs is approximately one barrel per hour. If greater amounts of drilling mud is lost, corrective measures are needed. Drilling generally is not resumed until the thief formation is closed off and circulation of the drilling mud reestablished.

The interruption of normal circulation prevents the entrainment of cuttings and other materials from the borehole, leads to reduced hydrostatic pressure possibly followed by the influx into the wellbore of high pressure formation fluids, can result in the flooding of oil-producing zones with mud or the like, and may eventually cause the drill string to become stuck in the borehole. Even in situations where circulation is not completely lost and some drilling mud can return to the surface, the drilling mud flowing into the lost circulation zone must be replaced continuously. If the drilling mud loss is sufficiently high, the cost of continued drilling or well operation may become prohibitive. Therefore, the lost circulation of drilling mud is a condition that must be prevented or be corrected as quickly as possible.

The best method of controlling lost circulation is to conduct a drilling program such that mud loss will not occur. However, situations exist wherein even correct drilling techniques cannot avoid lost circulation. Therefore, many methods have been used in attempts to plug the cracks or interstices of lost circulation zones to prevent the escape of drilling muds. As a result, a wide variety of materials have been pumped into the well with the drilling mud in an effort to bridge or fill the cracks or interstices of thief formations. It has been found that some materials are successful under certain drilling conditions, yet the same material is unsuccessful under other drilling conditions.

One common method is to increase the viscosity of the drilling mud or to increase the resistance of the drilling mud to flow into the formation. Another technique involves the addition of a bulk material, such as cottonseed hulls, cork, sawdust, perlite, ground walnut shells, hay, wood shavings, granular plastic, vermiculite, rock, mica flakes, leather strips, beans, peas, rice, sponges, feathers, manure, fish scales, corn cobs, glass fiber, asphalt, ground tires, burlap or other fabrics to the drilling mud. By adding these fibrous, flaky or granular solids to the drilling mud and pumping the resulting mixture into the borehole, a bridge or mat forms over the cracks or interstices responsible for drilling mud escape.

Although lost circulation zones frequently are plugged by such bulk materials, successful plugging of the thief formation is not assured. Even if large volumes of a solids-containing drilling mud are pumped into the borehole, a bridge or mat may never form over the cracks or interstices of the thief formation. Moreover, the introduction of large quantities of a drilling mud containing a relatively high percentage of bulky solids can produce pressure surges that cause further fracturing and therefore result in additional fissures for even greater drilling mud losses. Bulk materials further proved unsuccessful in sealing off porous formations because they have a tendency to deteriorate under the high drilling pressures, and therefore decrease in volume and become slimy so as to "worm" into the formation openings without forming an effective seal.

The water-swellable clays re-wetted and re-dried in accordance with the present invention unexpectedly have the ability to continue to increase the viscosity of aqueous liquids, with time, so that the clay will continue to swell upon entering the interstices of a thief formation for effective plugging

3. Foundry Industry Binders

Green sand molding is the production of molded metal objects from tempered molding sand and is the most diversified molding process used to cast ferrous as well as non-ferrous metal castings. Green sand molding is favored by foundry men because it is economical and permits both quality and quantity production. Green sand is defined as a water tempered molding sand mixture with plasticity. A green sand mold used for casting steel usually consists of silica sand, a clay binder, and/or an organic additive mulled together with temper water.

One or more binders mixed with the silica sand are essential to maintain the sand in a predetermined mold configuration. One of the most commonly employed green sand binders is clay, such as a water-swellable sodium bentonite clay or a low-swellable calcium bentonite clay. The amount of the clay binder that is used together with the sand generally depends upon the particular type of sand used in the mixture and the temperature of firing. Silica sand grains expand upon heating. When the grains are too close, the molding sand moves and expands causing the castings to show defects such as "buckles" (a deformity in the casting resulting from excessive sand expansion), "rat tails" (a rough, irregular depression that appears on the surface of a casting or a minor buckle), and "scabs" (a breaking away of a portion of the molding sand when hot metal enters the mold). To overcome this harmful expansion, more clay is added to the sand mixture since the clay contracts upon firing thereby compensating for the expansion of the silica sand grains. In green sand molding, the reproductability of the dimensions obtained on the casting are the result of such factors as shrinkage, changes in dimensions of mold cavity, hardness of mold, stability of molding sand, mechanical alignment of flask and maintaining a fixed temperature.

Clays have been blended in the past in an attempt to achieve acceptable combinations of premeabilities, green compression strengths and dry compression strengths in the molding sand mixture or composition. Toward this end, it is known to mix a sodium bentonite with a calcium bentonite or a kaolinite clay in an attempt to achieve the high dry compression strength of the sodium bentonite clay together with the high green compression strengths of the calcium bentonite clay and the low permeability of the kaolinite clay. See *Foundry Sand Practice* by Clyde A. Sanders, 6th Edition, 1973, pp 585–590. As set forth in a co-pending application, Ser. No. 336,095 filed Apr. 11, 1989, hereby incorporated by reference, a mixture of sodium bentonites as a binder in the preparation of a foundry sand, provides synergistic results with respect to green compressive strength; hot compressive strength; dry compressive strength; flowability; surface finish; activation speed; and/or shake-out. One or more of these properties are better in the blend than each of the sodium bentonites, prior to blending.

It has been found that water-swellable clays re-wetted and re-dried, in accordance with the present invention, have improved foundry properties for use as binders in the foundry industry, when used alone or in combination with other water-swellable clays.

4. Iron Ore Pelletizing

Taconite is a high-grade iron ore that consists chiefly of fine-grained silica mixed with magnetite and hematite. As the richer iron ores approach exhaustion in the United States, taconite becomes more important as a source or iron. To recover the ore mineral in a usable form for the production of iron, taconite must be finely ground, and the magnetite or hematite concentrated by a magnetic or other process. The concentrate must be agglomerated into chunks of size and strength suitable for the blast furnace.

Water-swellable clays, particularly sodium bentonites, have been used as binders for iron ores, such as taconite ores, in the formation of pellets having sufficient strength for subsequent processing of the iron ore pellets. Some of the important characteristics for the iron ore pellets bound with water-swellable clay are: ballability, the balling characteristics (kinetics) of the ore-water-clay mixture; wet compression strength of the pellet; resistance to fracture by impact (drop test); deformation under load; resistance to over-wetting of the pellet surface by recondensation of moisture onto the green balls in colder layers during drying; resistance to decrepitation (shock temperature), i.e. sudden pellet-spalling occurring when pellets are heated too rapidly; and dry compression strength.

Green ball agglomerates are normally produced by rolling moist fine ore in drums, discs or cones. Through the rolling action in the drum, the ore particles are rearranged and come into contact with each other. At the point of contact the liquid layers around the particles coalesce, causing a reduction of the external surface of the water film. A decrease in the free surface energy of the agglomerate is the driving force for the formation of the nuclei. During the subsequent growth these aggregates are compacted. The porosity decreases and the pore-water is forced to the surface. In this so-called transition region the rate of growth is maximal. Investigations into the mechanism of pellet formation have demonstrated that the kinetics of green pellet formation are extremely dependent on the free moisture content of the system.

Each system, dependent on ore and the water-swellable clay, has critical moisture limits within which strong green pellets are formed. At low moisture contents the rate of pellet growth is slow and the pellets are brittle. The rate of pellet growth increases as the amount of moisture increases. Beyond this moisture limit the rate of growth becomes excessive, and the pellets produced are irregular, weak and too plastic. Therefore, there exists a narrow range in which optimum pelletization results are achieved.

Since it is virtually impossible to extract water from the system, it is imperative that the binding additive must have moisture binding ability in order to control the effect of moisture in the feed. Bentonite, the most common additive, makes less water available to participate in the pelletizing process, due to an intra-crystalline absorption.

Water-swellable clays processed in accordance with the present invention by re-wetting and re-drying have new and unexpected properties in pelletizing iron ores, particularly taconite.

5. Water Absorbency and Swellability

The water-swellable clays re-wetted and re-dried in accordance with the principals of the present invention are capable of new and unexpected water-absorbancy and swellability making them very useful for a number of industrial products and processes. The water-swellable clays re-wetted and re-dried in accordance with the principles of the present invention provide unexpected water absorbency and swellability making the clays very suitable for use in moisture impervious panels; for preventing water contaminated with industrial waste from seeping through soil containing one or more of the treated water-swellable clays; for water-proofing compositions in non-viscous sprayable forms, or paste or putty-like forms, capable of being applied by spray methods, caulking gun, or trowel; for use together with elastomer and/or plasticisers for preventing the seepage of water through the compositions; together with other additives such as xanthan gum and/or other gums for maintaining stability in salt-contaminated water; together with other components to manufacture a flexible grout composition; for use as a water-swellable material in a layered water-sealing article of manufacture; for use in filtering contaminants from oils; for use in clarifying aqueous solutions, such as in the wine industry, and to flocculate contaminants from waste waters; and for use in carbonless copy paper when acid treated. Examples of these technologies and uses for water-swellable clays are disclosed in the following U.S. Patents, all of which are hereby incorporated by reference: Clem U.S. Pat. No. 3,186,896; Clem U.S. Pat. No. 4,048,373; Clem U.S. Pat. No. 4,021,402; Clem U.S. Pat. No. 4,084,382; Clem U.S. Pat. No. 4,087,365; Clem U.S. Pat. No. 4,279,547; McGroarty U.S. Pat. No. 4,316,833; Piepho U.S. Pat. No. 4,332,693; Harriett U.S. Pat. No. 4,534,925; Harriett U.S. Pat. No. 4,534,926; Alexander U.S. Pat. No. 4,634,538; Harriett U.S. Pat. No. 4,668,724; Harriett U.S. Pat. No. 4,696,698; Harriett U.S. Pat. No. 4,696,699; Alexander U.S. Pat. No. 4,886,550; Harriett U.S. Pat. No. 4,733,989; Alexander U.S. Pat. No. 4,832,793; Harriett U.S. Pat. No. 4,810,573; and Alexander U.S. Pat. No. 4,847,226.

In addition, the excellent gel strength achieved when the clays processed in accordance with the present invention are hydrated in water makes the clays processed in accordance with the present invention excellent suspending agents for use in the cosmetics and pharmaceutical industries in amounts well known in the art.

SUMMARY OF THE INVENTION

In brief, the present invention is directed to a method of treating a water-swellable clay after the clay has been mined and dried. After the common initial drying of the clay to a moisture content of 12% or less, the clay is re-wetted to a moisture content of more than 12% by weight, preferably at least about 15% or more, based on the dry weight of the clay, then re-dried to a moisture content of 12% by weight or less, based on the dry weight of the clay. This re-wetting and re-drying processing of a dried clay unexpectedly improves the water absorbency, and viscosity properties; increases the effectiveness of the clays as binders in sand molds and iron ore pelletizing; unexpectedly increases the rheology properties of the clays for oilwell drilling fluids, and lost circulation fluids, and as a suspending agent in the cosmetics and pharmaceutical industries; improves the binding characteristics of the clays to act as a binder for iron ores, such as taconite, and sand molding (foundry industry); and provides unexpectedly increased water absorption in forming water-swellable clay-based water barriers.

Accordingly, one aspect of the present invention is to provide a new and improved method of beneficiating the chemical and/or physical properties of water-swellable clays to improve their usefulness in one or more industries that water-swellable clays are used for their gel strength, suspending properties, binding properties, water-absorbing ability, or ability to increase the viscosity of aqueous liquids.

Another aspect of the present invention is to provide a new and improved method of treating a water-swellable clay that has been dried to a moisture content of about 12% by weight or less by re-wetting the clay to a moisture content of more than 12% by weight, preferably at least about 15% by weight, and then re-drying the clay to a moisture content of about 12% by weight or less.

Another aspect of the present invention is to provide a new and improved method of treating a water-swellable clay including drying the clay to a moisture content of about 12% by weight or less; re-wetting the clay to a moisture content of more than 12% by weight, preferably at least about 15% by weight; and then re-drying the clay to a moisture content of about 12% by weight or less.

Another aspect of the present invention is to provide a new and improved method of treating a water-swellable clay that has been dried to a moisture content of about 12% by weight or less by re-wetting the clay to a moisture content of more than 12% by weight, preferably at least about 15% by weight, and then re-drying the clay to a moisture content of about 12% by weight or less, to improve the gel strength of the clay.

Still another aspect of the present invention is to provide a new and improved method of treating a water-swellable clay that has been dried to a moisture content of about 12% by weight or less by re-wetting the clay to a moisture content of more than 12% by weight, preferably at least about 15% by weight, and then re-drying the clay to a moisture content of about 12% by weight or less, to improve the capacity of the clay to suspend and/or flocculate solids or immiscible liquids in aqueous or organic dispersions.

Another aspect of the present invention is to provide a new and improved method of treating a water-swellable clay that has been dried to a moisture content of about 12% by weight or less by re-wetting the clay to a moisture content of more than 12% by weight, preferably at least about 15% by weight, and then re-drying the clay to a moisture content of about 12% by weight or less, to improve the water-absorbing capacity of the clay.

Another aspect of the present invention is to provide a new and improved method of treating a water-swellable clay that has been dried to a moisture content of about 12% by weight or less by re-wetting the clay to a moisture content of more than 12% by weight, preferably at least about 15% by weight, and then re-drying the clay to a moisture content of about 12% by weight or less, to increase the capacity of the clay to increase the viscosity of aqueous liquids.

A further aspect of the present invention is to provide a new and improved method of treating a water-swellable clay that has been dried to a moisture content of about 12% by weight or less by re-wetting the clay to a moisture content of more than 12% by weight, preferably at least about 15% by weight, and then re-drying the clay to a moisture content of about 12% by weight or less, to increase the capacity of the clay to bind adjacent particles together, such as in forming sand molds for the foundry industry, and in binding iron ore particles together in forming iron ore pellets.

Another aspect of the present invention is to provide a new and improved method of treating a water-swellable clay that has been dried to a moisture content of about 12% by weight or less by re-wetting the clay to a moisture content of more than 12% by weight, preferably at least about 15% by weight, and then re-drying the clay to a moisture content of about 12% by weight or less, to increase the gel strength of an aqueous drilling mud containing the treated clay.

Still another aspect of the present invention is to provide a new and improved method of treating a water-swellable clay that has been dried to a moisture content of about 12% by weight or less by re-wetting the clay to a moisture content of more than 12% by weight, preferably at least about 15% by weight, and then re-drying the clay to a moisture content of about 12% by weight or less, to increase the capacity of the clay, in aqueous suspension, to plug cracks and interstices in a well to minimize loss of a drilling fluid.

The above and other aspects and advantages of the present invention will become more apparent when considered together with the following detailed description of the preferred embodiments.

DETAILED DESCRIPTION OF THE PREFERRED EMBODIMENTS

The present invention is directed to a method of treating water-swellable clays by re-wetting and re-drying a mined, dried water-swellable clay to very simply and unexpectedly improve many of the properties that make water-swellable clays desirable industrial additives. Water-swellable clays, such as sodium bentonite, are obtained for use in the aforementioned industries by mining the clay, in a wet condition, generally having about 20% to about 25% by weight water, based on the dry weight of the clay, and then drying the clay to a suitable moisture content, e.g. 5–10% based on the dry weight of the clay so that the clay is suitable for grinding to a desired particle size distribution. Sometimes these clays are dried in the field to a desirable moisture content of about 10–15% water, based on the dry weight of the clay so that the industrial drying step is unnecessary prior to grinding. In any event, the clay is always too wet, as mined, to effectively grind the clay to a desired particle size distribution so that drying is always necessary after mining and prior to grinding.

Unexpectedly, and surprisingly, it has been found that if the mined and dried clay is re-wetted to a moisture content of more than 12% by weight, preferably at least about 15% by weight water, based on the dry weight of the clay, and preferably to about 18% to about 25% water, based on the dry weight of the clay and then re-dried down to a moisture content of about 12% by weight or less, preferably about 5% to about 8% or 10% water, based on the dry weight of the clay, the thus processed clay has improved properties of viscosity; water absorbency; capacity to disperse solids and water-insoluble materials in aqueous suspension; capacity to flocculate suspended solids from water; and binding ability both for the foundry industry as a sand binder, and as an ore, e.g. iron ore binder, particularly a taconite binder for pelletizing taconite.

The water-swellable colloidal clays that are improved in accordance with the method of the present invention are any water-swellable colloidal clay which will hydrate in the presence of water, i.e., will swell in the presence of water. In accordance with one important embodiment of the present invention, the colloidal clay is bentonite. A preferred bentonite is sodium bentonite which is basically a hydratable montmorillomite clay of the type generally found in the Black Hills region of South Dakota and Wyoming. This clay has sodium as a predominant exchange ion. However, the bentonite utilized in accordance with this embodiment of the present invention may also contain other cations such as magnesium and iron. There are cases wherein a montmorillomite predominant in calcium ions can be converted to a high swelling sodium variety through a well known process called "peptizing". The colloidal clay utilized in this invention may be one or more peptized bentonites. The colloidal clay may also be any member of the dioctahedral or trioctahedral smectite group or mixtures thereof. Examples are Beidellite, Nontronite, Hectorite, Sepiolite and Samonite. Attapulgite and Kaolin clay also are beneficiated when re-wetted and re-dried in accordance with the present invention. To achieve the full advantage of the present invention, the colloidal clay, i.e. bentonite, generally is finely divided or ground as known for use in water barrier panels and the like, i.e., 20 to 350 mesh, preferably 20 to 50 mesh, either prior to re-wetting, or after re-wetting and drying the re-wetted clay.

The crude mined clay can be dried in any manner that is known in the art to achieve a clay in a condition capable of being ground to a desired particle size distribution. It is common in the art to grind the clay and grinding can be performed in accordance with the present invention prior to or after re-wetting and re-drying the clay, to achieve the same beneficial results.

In accordance with the principles of the present invention, the mined and dried clay should be re-wetted to a water content of at least about 15% based on the dry weight of the clay and re-dried to a water content of about 12% or less, based on the dry weight of the clay, prior to or after grinding. The improvement in clay properties is achieved in accordance with the present invention regardless of the method used for wetting, drying, and grinding the clay so long as the dried water-swellable clay, having a moisture content of about 12% or less, is re-wetted to a water content of more than 12% by weight, preferably at least about 15% by weight, based on the dry weight of the clay, and more preferably at least about 18% based on the dry weight of the clay, and thereafter re-dried to a water content of about 12% or less, based on the dry weight of the clay.

To illustrate the substantial and unexpected increase in the properties of a water-swellable clay when re-wetted and re-dried in accordance with the present invention, a crude sodium bentonite clay was obtained from the Black Hills region of South Dakota, and the clay was dried after mining to a moisture content of 6.8% by weight water, based on the dry weight of the clay, and ground so that 80% by weight of the bentonite clay passed through a 200 mesh screen. Example 1 in the following Table I shows the properties of a first portion of the sodium bentonite clay that was not re-wetted and re-dried. Example 2 of Table I shows the same clay that has been further processed by re-wetting to a water content of 18% water, based on the dry weight of the clay, and then re-dried to a moisture content of 6.6%, based on the dry weight of the clay. Example 3, of Table I shows the properties of the same dried, ground clay mixed with 20 pounds per ton of soda ash and thereafter re-wetted to a moisture content of 18% water, based on the dry weight of the clay, and re-dried to a moisture content of 6.6% water, based on the dry weight of the clay.

TABLE I

| EXAMPLE | 1 | 2 | 3 |
|---|---|---|---|
| Moisture Content (% by wt) | 6.8 | 6.6 | 6.6 |
| Free Swell (cc/2g) | 30 | 34 | 34 |
| % WPA | 839 | 909 | 950 |
| viscosity: 600 dynes/cm$^2$ | 18 | 41 | 56 |
| viscosity: 300 dynes/cm$^2$ | 10 | 25 | 35 |
| AV (cps) | 9 | 20.5 | 28 |
| PV (cps) | 8 | 16 | 21 |
| YP (lbs/100 sq ft) | 2 | 9 | 14 |
| Fluid Loss (mls) | 15.7 | 12.0 | 11.8 |
| Immediate Viscosities at Varying Hydration Times | | | |
| 2 minutes (600/300) | 16/10 | 22/13.5 | — |
| 4 minutes (600/300) | 16/10 | 23/14 | — |
| 6 minutes (600/300) | 16/10 | 24/15 | — |
| 10 minutes (600/300) | 16/10 | 25/15 | — |
| 15 minutes (600/300) | 16/10 | 26/16 | — |
| 20 minutes (600/300) | 16/10 | 26.5/16 | — |

As shown in Table 1, the viscosity of aqueous solutions containing 6% by weight clay processed in accordance with Examples 2 & 3 were substantially and unexpectedly higher than the same aqueous solutions containing the same percentage of the clay of Example 1. Further, the free swell and water absorption capacity for the clays processed in accordance with Example 2 & 3 were substantially and unexpectedly higher than the clay of Example 1.

A very unexpected property, making the clays processed in accordance with the present invention very useful in fluid loss compositions, is the ability of the clays processed in accordance with the present invention to increase the viscosity of aqueous compositions with time, as shown in the lower portion of Table I. As shown in Table I, an aqueous composition containing the clay of Example 1 had a constant viscosity in aqueous solution with time, whereas aqueous compositions containing the clays of Examples 2 and 3, processed in accordance with the present invention, showed unexpected increases in viscosity with time, enabling the clays to enter cracks and interstices in drill hole earthen formations while in the incompletely swollen state and later swell to clog the thief formation.

It should be understood that the present disclosure has been made only by way of preferred embodiments and that numerous changes in details of construction, combination and arrangement of parts can be resorted to without departing from the spirit and scope of the invention as hereunder claimed.

What is claimed and sought to be secured by Letters Patent of the United States is:

1. A method of treating a water-swellable clay that has been recovered and dried to a moisture content of 12% or less, based on the dry weight of the clay, to improve one or more of its properties comprising:
   re-wetting the clay to a moisture content in the range of about 15% to about 25% by weight based on the dry weight of the clay; and
   drying the re-wetted clay to a moisture content of about 12% by weight or less, based on the dry weight of the clay.

2. The method of claim 1 further including grinding the clay prior to re-wetting the clay.

3. The method of claim 1 further including grinding the clay after drying the re-wetted clay.

4. The method of claim 1 wherein the water-swellable clay is re-wetted to a moisture content of about 18% to about 25% by weight based on the dry weight of the clay, prior to re-drying.

5. The method of claim 1 wherein the water-swellable clay is re-wetted to a moisture content of about 20% by weight, based on the dry weight of the clay, prior to re-drying.

6. The method of claim 1 wherein the water-swellable clay is selected from the group consisting of montmorillomite, beidellite, nontronite, hectorite, sepiolite and samonite.

7. The method of claim 1 wherein the water-swellable clay is a montmorillomite clay.

8. The method of claim 7 wherein the water swellable clay is bentonite.

9. The method of claim 7 wherein the water-swellable clay is bentonite having sodium as its principle exchangeable cation.

10. The method of claim 2 wherein the clay is ground so that at least 80% by weight of the clay passes through a 200 mesh screen.

11. The method of claim 3 wherein the clay is ground so that at least 80% by weight of the clay passes through a 200 mesh screen.

* * * * *